Patented Sept. 8, 1942

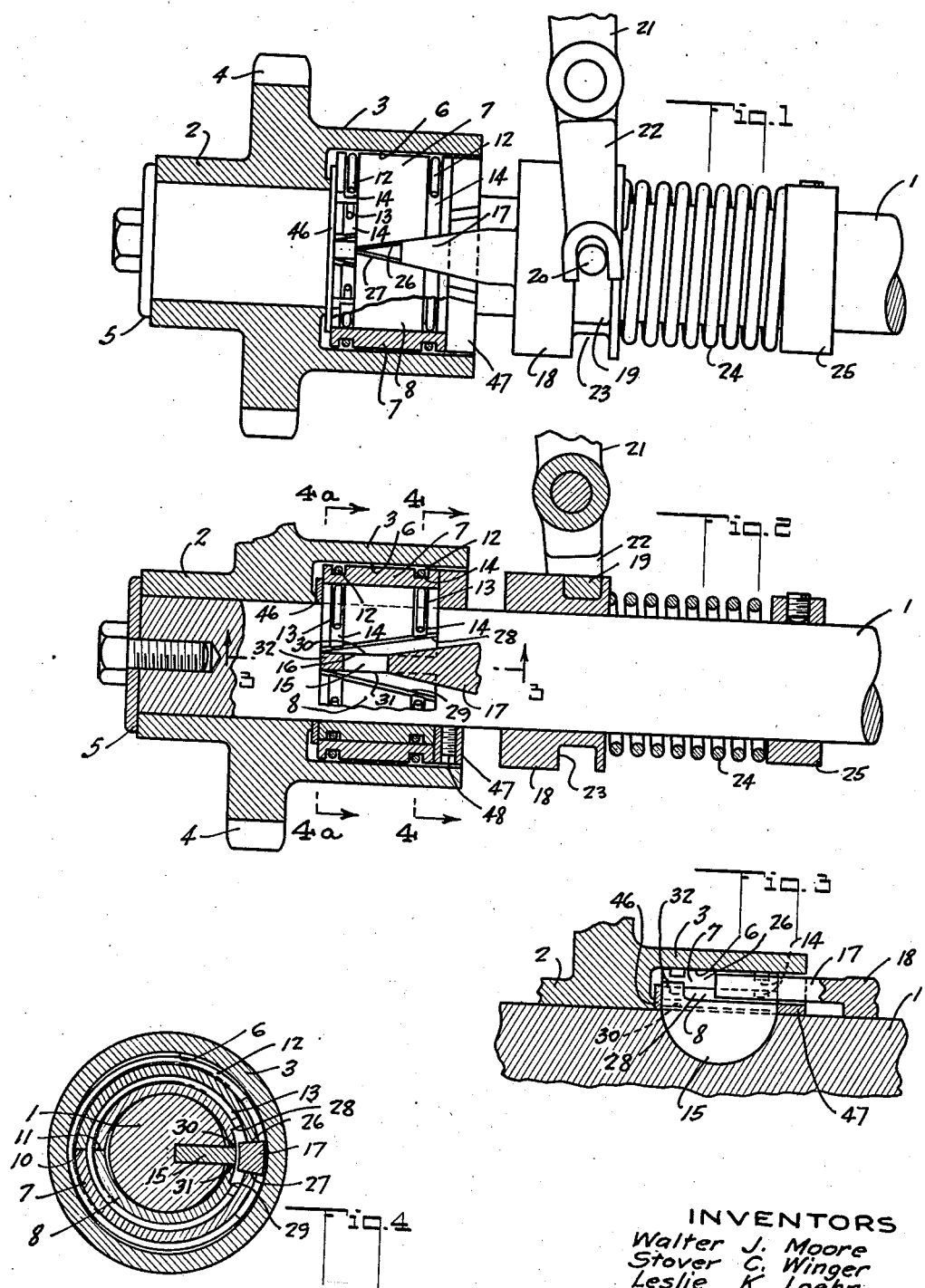

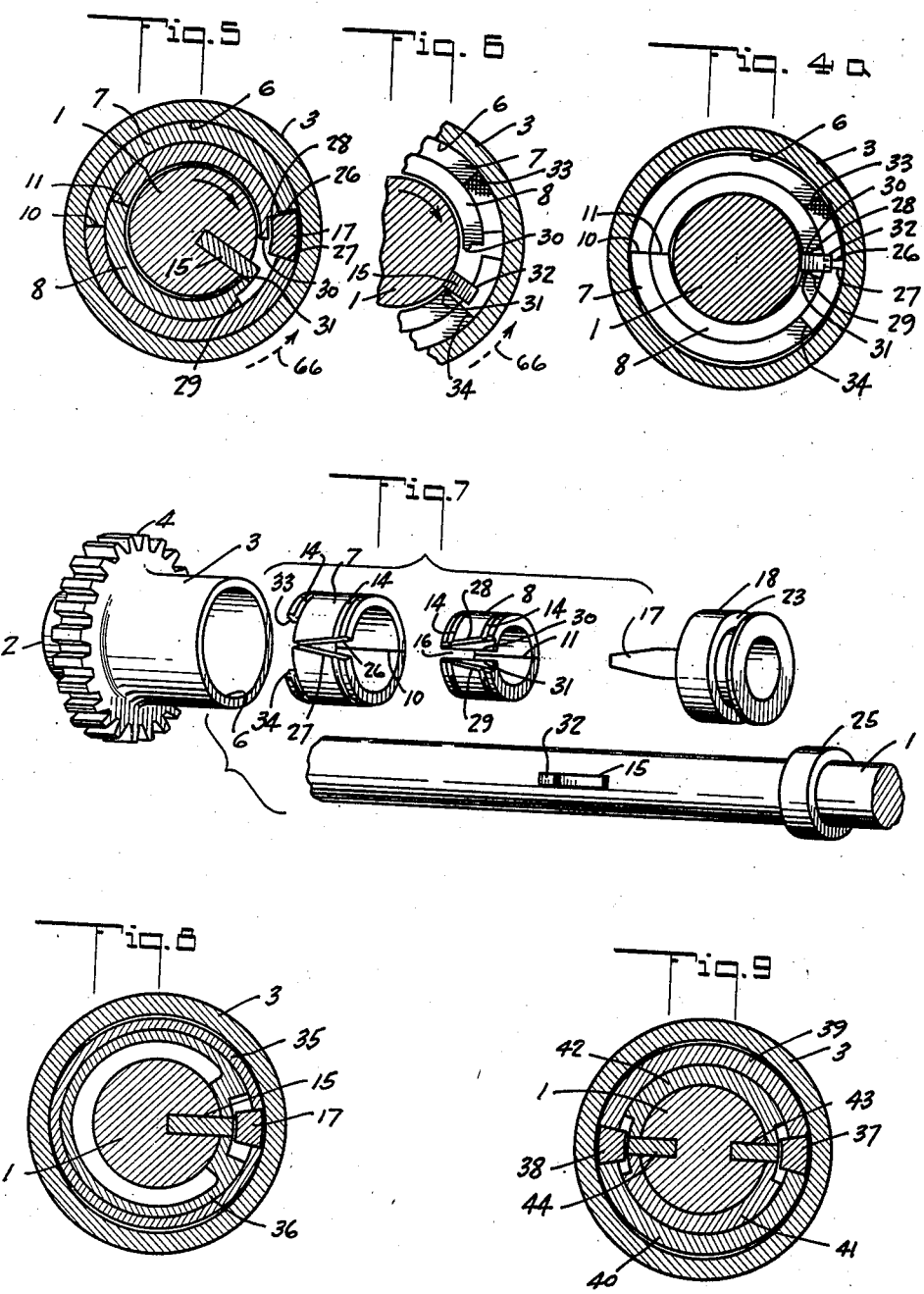

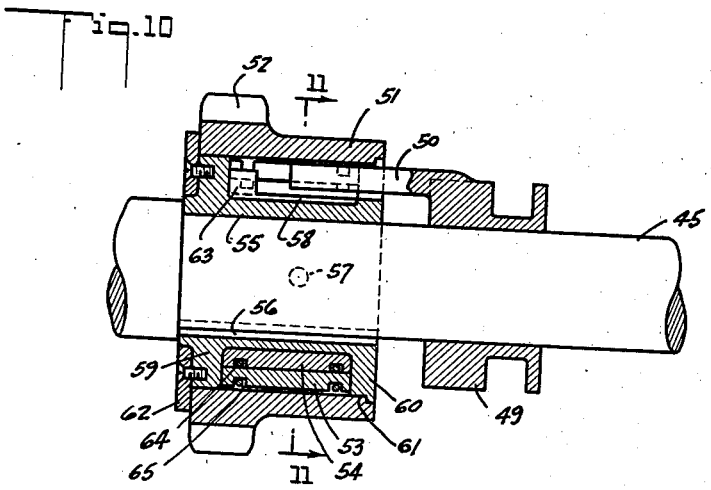
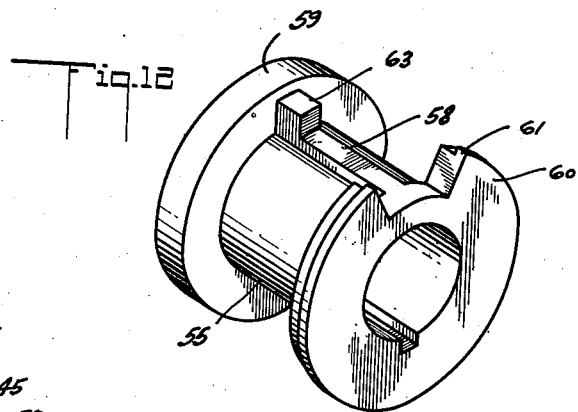
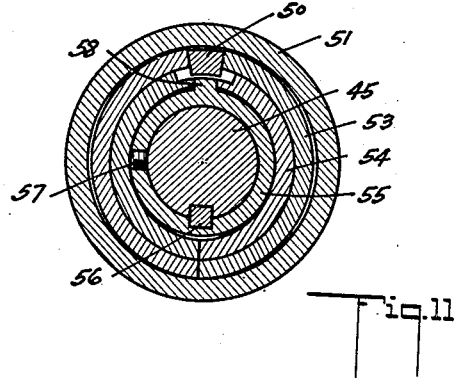

2,295,181

UNITED STATES PATENT OFFICE 2,295,181

CLUTCH MECHANISM

Walter J. Moore, Huntington Park, and Stover C. Winger and Leslie K. Loehr, Los Angeles, Calif., assignors to Guy H. Hall, Los Angeles, Calif.

Application May 12, 1941, Serial No. 393,062

18 Claims. (Cl. 192—77)

This invention relates to a clutch mechanism. Mechanisms of this character have been employed, in which the power transmission from one rotatable part to another is effected by the aid of clutch elements having contacting frictional surfaces. Clutching is accomplished by employing pressure between these contacting clutch surfaces; for example, in the case of an automobile disc clutch, one disc of the clutch is urged axially toward another disc, as by the aid of a strong compression spring. One of the discs at least, is provided with an appropriate clutch facing, that creates the frictional forces.

The maximum amount of torque that can be transmitted by a device of this kind is a function of the coefficient of friction between the contacting surfaces, the pressure per unit of area that urges the surfaces together, and the area of contact.

Disc clutches of the type mentioned require relatively large overall diameters for the transmission of large torques, for it is necessary to provide a considerable area of contact between the friction surfaces of the discs.

It is one of the objects of this invention to make it possible to reduce very greatly the overall size of clutches without reduction in the capability of the clutches to transmit the requisite power (which is proportional to the product of torque and angular velocity). By the aid of this invention, clutches capable of transmitting even several horsepower at the usual speeds, may be made of such compact form as to provide a very inexpensive structure.

In accordance with this invention, the clutching surfaces are cylindrical, formed partly by one of a plurality of concentric rings, nested one within another. By a novel arrangement of the parts, the exterior cylindrical surface of the outermost ring is utilized as a clutching surface, and the pressure between the clutching surfaces is made adequate in response to the initiation of the clutching operation. It is accordingly another object of this invention to employ this type of clutching surface. It is necessary to employ only a light initiating pressure for causing clutch engagement, and yet upon release of this initiating pressure, the clutch soon disengages.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a side elevation, partly in section, of a clutch mechanism incorporating the invention, the clutch being in disengaged position;

Fig. 2 is a longitudinal sectional view of the clutch mechanism illustrated in Fig. 1;

Fig. 3 is a sectional view taken along plane 3—3 of Fig. 2;

Figs. 4 and 4a are sectional views taken respectively along planes 4—4 and 4a—4a of Fig. 2;

Fig. 5 is a sectional view similar to Fig. 4 but illustrating the position of the parts when the clutch is in completely engaged position;

Fig. 6 is a fragmentary sectional view similar to Fig. 4a but illustrating the position of the clutch elements in complete engagement;

Fig. 7 is an exploded pictorial view showing the important elements of the clutching device in separated position;

Figs. 8 and 9 are views similar to Fig. 4, of modified forms of the invention;

Fig. 10 is a sectional view similar to Fig. 2 of a further modified form of the invention;

Fig. 11 is a sectional view taken along plane 11—11 of Fig. 10; and

Fig. 12 is a pictorial view of one of the elements of the clutch illustrated in Fig. 10.

In the form of the invention illustrated in Figs. 1 to 7 inclusive, a pair of coaxial rotary members that are to be joined against relative rotation are illustrated; these rotary members in one form of mechanism to which the invention may be applied, may be termed the clutch elements. One of these rotary members may be the driving member and the other may be a driven member. In the present instance the driving member may be in the form of a shaft 1 which may be connected to a source of power such as a motor. This shaft 1 at its left hand extremity is shown as having journaled upon it the hub 2 of a rotary driven member 3. This driven member may be provided with a gear or pinion portion 4. Furthermore, in order to limit axial movement of the member 3 toward the left, a stop collar 5 (Figs. 1 and 2) may be provided abutting against the left hand edge of the hub 2.

The rotary driven member 3 in this case has an internal cylindrical clutching surface 6. Interposed between this clutching internal cylindrical surface 6 and the driving shaft 1 are a plurality of interrupted bands. Two such bands 7 and 8 are shown in the present instance. These are nested together. The inner band 8 thus is located within the outer band 7. By appropriate mechanism hereinafter to be described, these bands are caused to expand and to be placed in serial angular driving relation. The outer surface of band 7 is thereby caused frictionally to contact the internal cylindrical surface 6. The inner band 8 is caused to be in driving relation to the outer band 7, for exerting an expanding force thereon. This engaged position is illustrated in Fig. 5

By providing a mechanical connection between the driving shaft 1 and the inner band 8, then due to the frictional engagements just described, a clutching effect is obtained, and rotary member 3 is frictionally restrained against relative angular motion.

Each of the bands 7 and 8 is shown in this instance as being formed of half sections, and of sufficient thickness to withstand any force reasonably encountered, without appreciable deformation. Therefore the expansion and contraction of each band are effected by relative movement of the half sections, rather than by straining the material in a continuously formed band. The outer band 7, as shown most clearly in Fig. 7, for this purpose has a split 10. Similarly the inner band 8 is provided with a split 11. Both of these bands in the present instance are urged to the collapsed position of Figs. 1, 2, 4 and 4a, by the aid of interrupted spring rings 12, 13. These spring rings are conveniently accommodated in grooves such as 14 provided in the outer peripheries of the bands 7 and 8. The clearances indicated in these figures between the various band surfaces are purposely shown exaggerated. In an actual embodiment, these clearances are of the order of one or two one-thousandths of an inch.

In order to connect the inner band 8 in driving relation with the shaft 1, use is made of a key 15 which is seated in the shaft 1. It projects into the split 16 in the band 8 (Fig. 7). Accordingly if the shaft 1 rotates in a clockwise direction as indicated in Fig. 5, the key 15 urges the inner band 8 in the same direction. This band 8 is coupled mechanically to the outer band 7. We may assume that this outer band is expanded so as to engage the surface 6 frictionally. Any restraint on the rotation of rotary member 3 causes transmission of a force through rotary member 3, outer band 7, and inner band 8 against this driving key 15. This force, as will be hereinafter explained, will impose a further expanding force on outer band 7.

Since the areas of contact between the outer band 7 and member 3 are quite large, and since a large expanding force ultimately results, the entire clutch mechanism may be kept quite small and yet a large torque may be transmitted between the shaft 1 and the member 3. Furthermore, it has been found that for good results the outer band 7 may be of cast iron or bronze; the rotary member 3 may be of steel, to provide considerable friction; the inside band 8 may be of steel, and of course the shaft 1 may be most conveniently made of steel or the like.

In order to bring the band 7 to the expanded position, provisions are made for causing an initial expansion of that band.

The imposition of an initial expanding force upon the band 7 is accomplished by the aid of a tapered key or rod 17, movable parallel to the axis of shaft 1, but spaced therefrom. As shown most clearly in Figs. 3 and 7, this bar or rod 17 is formed integrally with a shift collar 18. This shift collar 18 may be moved longitudinally of the axis of shaft 1 by the aid of a shift fork 21. This shift fork has a yoke 22 in engagement with the diametrically oppositely extending pins 20. These pins 20 are attached to a saddle 19 located in a peripheral groove 23 of collar 18. In this way rotation of collar 23 with respect to the non-rotary saddle 19 is permitted.

The shift fork 22 serves to withdraw the key 17 in a direction toward the right as viewed in Fig. 1. A compression spring 24 resiliently urges the collar 18 into clutch engaging position. The right hand end of the spring 24 abuts the stationary collar 25 fastened to the shaft 1 in any appropriate manner.

The tapered end of key 17 is thus given an axial movement by spring 24 urging it to contact the oppositely tapered ends 26 and 27 of band 7. Accordingly for this purpose the key 17 is spaced from the axis of shaft 1 by a distance corresponding to the radius of the outer band 7. Thus if the shift fork 21 is released from the position of Fig. 1, the spring 24 is free to act to urge the band 7 into contact with the driven member 3.

The key 17 also serves to couple the inner band 8 to the outer band 7, in a serial arrangement. For this purpose the key 17 is deep enough in a radial direction to extend between the tapered ends 28 and 29 of the inner band 8. This is shown quite clearly in Fig. 3. The key 17 extends about half way radially between the inner and outer surfaces of the band 8 and does not interfere with the key 15, which is disposed between the parallel portions 30 and 31 of the ends of the band 8.

Assuming that the key 17 is in the position of Fig. 1, the outer band 7 and the inner band 8 are in the collapsed position illustrated most clearly in Fig. 4, and there is no tight frictional engagement between the outer band 7 and the rotary member 3. As shaft 1 rotates, the inner and outer bands 8 and 7 are correspondingly rotated because the keys 15 and 17 effectively couple both bands to the shaft. But since the outer band 7 is in collapsed position, this band is out of contact with member 3, which accordingly is unclutched.

When the key 17 is urged toward the left as viewed in Fig. 1 by the spring 24, the bands 7 and 8 are ultimately caused to assume the position of Fig. 5. The key 17 by its wedging action first causes the outer band 7 to engage frictionally with the internal cylindrical surface 6 of rotary member 3. Upon rotation of shaft 1 in a clockwise direction as viewed in Fig. 5, the key 15, being in engaging position with the end surface 31 of inner band 8, imposes a thrust upon this end of the band. Since as yet there is no restraint against free angular motion of band 8, this thrust carries the band 8 angularly around so that its tapered end surface 28 is urged into contact with the key 17. This key 17 resists rotation about the axis of shaft 1, for it is coupled, by band 7, to the driven member 3, and rotation of this member 3 is resisted by the load that is intended to be driven through the clutch. Accordingly, one side 31 of the interruption in band 8 is urged by key 15 to spread the gap in this band. This causes the band to expand into engagement with band 7, but not with any substantial friction. In addition, a thrust through key 17 by surface 28 of band 8 is imposed upon end surface 27 of outer band 7. This thrust assists the wedging action of key 17, and in fact takes over the spreading function. The gap in band 7 is caused to spread so that its end surface 26 has a minute clearance with respect to key 17. This clearance is shown exaggerated in Fig. 5.

Key 17 in this ultimate, fully engaged position serves to couple the bands 8 and 7 serially. The frictionally engaged surfaces interposed between the driving and driven members comprise the engaged surfaces between band 7 and rotary driven member 3.

The ultimate position of Fig. 5 is not attained until after a few revolutions of shaft 1, permitting time for sufficient frictional build up between band 7 and member 3. This friction is caused to increase by the spreading action imposed upon band 7 by the inner band 8; and the greater the friction, the greater is the force of expansion that the inner band 8 can exert. This is evident since rotary member 3 is strongly restrained by the load to which it is coupled. During this build up period, band 7 is forcibly angularly rotated within the restrained outer member 3, and it is not until sufficient friction develops that band 7 is restrained against further relative movement with respect to member 3. These frictionally engaged surfaces are of considerable area and are sufficient, ultimately to hold the driving and driven members against angular displacement.

The description of the mechanism has been made with the assumption that shaft 1 is the driving member. However, identically the same result occurs if the rotary member 3 be driven in a counterclockwise direction, as indicated by dotted arrow 66 (Figs. 5 and 6) and the shaft 1 is then the driven member.

In order to release the clutch, the shift fork 21 is moved to the position of Fig. 1. This permits the bands 7 and 8 to collapse to the position of Fig. 4. Collapsing of the bands upon withdrawal of key 17 occurs by resilient action of the spring rings 13, 14. However, in order positively to ensure that the frictional surfaces will separate and that the bands will return to the disengaged position of Fig. 4, a special arrangement is provided which may be explained more particularly in connection with Figs. 3, 4a and 6.

This arangement includes the stop or abutment 32 formed integrally at the left hand end of key 15. This stop extends between the widely spaced surfaces 33 and 34 of the outer band 7. In the collapsed or disengaged position illustrated in Fig. 4a, the stop 32 is disposed centrally of the slot formed between the surfaces 33 and 34. When the clutch is in engagement, the stop 32 is very close to the surface 34, as illustrated in the engaged position of Fig. 6. As soon as the key 17 moves to the disengaging position, it permits inner band 8 to move clockwise within outer band 7; and this action in turn permits abutment 32 to hit surface 34. This results in breaking the frictional contact between band 7 and surface 6, and the bands collapse to the disengaged position of Fig. 4.

In order to effect these results, care must be taken to choose the angular separation of the faces 33 and 34 of the outer band 7 of such amount that when the clutch is in engagement, the stop 32 is very close to the surface 34. These clearances are shown exaggerated in Fig. 6.

Means are provided for restraining the bands 7 and 8 against axial movement along shaft 1. For this purpose a collar 46 may be provided adjacent the inner end of the hub 2. A restraining collar 47 adjacent the right hand ends of these bands may be fastened to the shaft 1 as by the aid of the set screw 48.

In the form of the invention just described, the outer and inner bands 7 and 8 are shown as made in several segments of rigid material.

In the form illustrated in Fig. 8, the outer band 35 and the inner band 36 are each shown as made from a single piece of metal having springy characteristics. In this form of the invention it is not necessary to employ the spring rings 13, 14. The inherent resilience of the bands themselves are so arranged as to exert a constant contracting force upon the bands 35 and 36. The band 35 may conveniently be made of spring bronze; and the inner band 36 may conveniently be made of spring steel. In other respects the operation of this form of the invention is similar to that described in connection with Figs. 1 to 7.

In the forms thus far described but a single expanding wedge key 17 is utilized to cause initial expansion of the outer band. In the form of the invention illustrated in Fig. 9, two such keys 37 and 38 are provided arranged diametrically to each other. These keys are joined to a common collar such as the shift collar 18. The outer band thus comprises the segments 39 and 40. The inner band comprises the segments 41 and 42. Two gaps are formed in each of these bands, respectively accommodating the keys 37, 38; and the driving keys 43 and 44 seated in shaft 1. These keys 43 and 44 are identical in construction with the key 15 illustrated in the form first described.

A somewhat simplified form of the invention is illustrated in Figs. 10, 11 and 12.

In this form of the invention the rotary driving member may be the shaft 45. As before, there is a sliding collar 49 operated similarly to collar 18 in the form first described. The key 50, similar to key 17, is carried by the shift collar 49.

The outer rotary member 51 is shown as formed integrally with a pinion 52. The outer band 53 and the inner band 54 are similar in construction to the bands 7 and 8 described in connection with the first form of the invention. In this instance the shaft 45 has an overlying sleeve 55 (shown most clearly in Fig. 12). This sleeve 55 may be keyed to the shaft 45 as by the aid of the key 56. A headless set screw 57 may also be provided for retaining the sleeve 55 in proper axial position.

Sleeve 55 is immediately adjacent the inner band 54. It is provided with the projecting key or tongue 58 serving the same function as the key 15 of Fig. 4. It enters between the open ends of the inner ring 54.

The sleeve 55 may be provided with the integral flanges 59 and 60. The flange 59 is telescoped into the outer rotary member 51. The flange 60 has a peripheral extension 61 which engages in a corresponding recess in the outer rotary member 51 and maintains this outer rotary member 51 against axial movement toward the right. In order to prevent axial movement of the rotary member 51 toward the left, a collar 62 may be fastened to the flange 59 and extending along the left hand face of the rotary member 51.

As in the form illustrated in Figs. 1 to 7, the driving extension 58 is provided with an integral stop or abutment 63, serving the same function as the stop or abutment 32. If desirable, as in the form first described, spring rings 64 and 65 may be utilized to assist in the contraction of the band upon withdrawal of the expanding key 50 from clutch engaging position.

The principle of utilizing frictional forces between nested bands to lock a pair of concentric members together may be utilized for other mechanisms than those specifically described, such as for braking or the like.

What is claimed is:

1. In a clutch mechanism, a rotary driving member, a rotary driven member, said members being co-axial, one of said members having an internal surface of revolution forming a clutching surface, a plurality of nested interrupted bands interposed between said surface and the other member, the innermost band having an end in positive driving relation to the other of said members, the outermost band having an external surface adapted to cooperate with said internal surface, and means for causing adjacent bands to engage serially in angular driving relation with each other.

2. In a clutch mechanism, a rotary driving member, a rotary driven member, said members being co-axial, one of said members having an internal surface of revolution forming a clutching surface, a plurality of nested interrupted bands interposed between said surface and the other member, the innermost band having an end in driving relation to the other of said members, the outermost band having an external surface adapted to co-operate with said internal surface, and means for causing the bands to be driven in serial angular relation for maintaining the outermost band in cooperative relation with said internal surface.

3. In a clutch mechanism, a rotary driving member, a rotary driven member, said members being coaxial, one of said members having an internal surface of revolution forming a clutching surface, a plurality of nested interrupted bands interposed between said surface and the other member, the innermost band having an end in driving relation to the other of said members, the outermost band having an external surface adapted to cooperate with said internal surface, and a clutch operating device comprising a shiftable arm adapted to enter into the gap of the outermost band for expanding it into contact with said internal surface, said arm also being disposed in the gap between the ends of the next inner band.

4. In a clutch device, a rotary driving member, a rotary driven member, said members being coaxial, one of said members having an internal surface of revolution forming a clutching surface, a pair of interrupted bands interposed between the members, one band having an external surface adapted to contact with said internal surface, the other band having an external surface adapted to contact with the internal surface of said first band, the interruptions in the bands forming gaps that are substantially alined along the radius to the common axis of the members, and means for controlling the clutching action, comprising an arm entering into the gaps and operating to expand one of the bands to cause its external surface to engage the corresponding internal surface.

5. In a clutch device, a rotary driving member, a rotary driven member, said members being co-axial, one of said members having an internal surface of revolution forming a clutching surface, a pair of interrupted bands interposed between the members, one band having an external surface adapted to contact with said internal surface, the other band having an external surface adapted to contact with the internal surface of said first band, the interruptions in the bands forming gaps that are substantially alined along a radius to the common axis of the members, and means for controlling the clutching action, comprising an arm entering into the gaps and operating to expand one of the bands to cause its external surface to engage the corresponding internal surface, and an abutment carried by the inner of the two rotary members and entering into the gap of the outer band.

6. In a clutch device, a rotary driving member, a rotary driven member, said members being coaxial, one of said members having an internal surface of revolution forming a clutching surface, a pair of interrupted bands interposed between the members, one band having an external surface adapted to contact with said internal surface, the other band having an external surface adapted to contact with the internal surface of said first band, the interruptions in the bands forming gaps that are substantially alined along a radius to the common axis of the members, each of said bands being formed of a pair of segments, and a tapered arm movable in an axial direction and adapted to enter into at least one of the gaps for expanding the corresponding segments into contact with the corresponding internal surface.

7. In a clutch device, a rotary driving member, a rotary driven member, said members being coaxial, one of said members having an internal surface of revolution forming a clutching surface, a pair of interrupted bands interposed between the members, one band having an external surface adapted to contact with said internal surface, the other band having an external surface adapted to contact with the internal surface of said first band, the interruptions in the bands forming gaps that are substantially alined along a radius to the common axis of the members, each of said bands being formed of a pair of segments, and a tapered arm movable in an axial direction and adapted to enter into both gaps for expanding one of the bands and for transmitting the force across the gaps from the end of the outer band to the opposite end of the inner band, as the said outer band is carried around by engagement of its external surface with the said internal clutching surface.

8. In a clutch device, a rotary driving member, a rotary driven member, said members being co-axial, one of said members having an internal surface of revolution forming a clutching surface, a pair of nested interrupted spring bands interposed between the members, the outer band having an external surface adapted to contact with the internal surface, means for expanding both bands, and means forming a stop carried by the other of said rotary members, interposed between the ends of the outer band.

9. In a clutch device, a pair of rotary members disposed coaxially, one surrounding the other, the outer member having an internal clutching surface, a pair of nested interrupted bands disposed between the members, each band being formed of a pair of segments and forming a pair of gaps, a pair of stops joined to the inner member and entering respectively into the gaps of the outer band, and a pair of arms movable in an axial direction and respectively entering into the gaps of the outer band to expand said outer band into contact with said internal surface, said arms also serving to transmit the forces from the ends of the segments of the outer band to the opposite ends of the segments of the inner band.

10. In a clutch device, a rotary driving member, a rotary driven member, said members being coaxial, one of said members having an internal surface of revolution forming a clutching surface, a plurality of interrupted bands interposed between the members, said bands being nested and of progressively increasing diameters from the inner rotary member to the outer rotary member, means for coupling one end of the innermost band to the inner rotary member, and means for transmitting a force serially and angularly through the bands to cause the peripheral surface of the outermost band to operate as a frictional clutching surface.

11. In a clutch device, a rotary driving member, a rotary driven member, said members being coaxial, one of said members having an internal surface of revolution forming a clutching surface, a plurality of bands each having a gap, arranged between the members, said bands being of progressively increasing diameters from the inner rotary member to the outer rotary member, means for coupling one end of the innermost band to the inner rotary member, means for transmitting a force between one end of a band to the opposite end of the next succeeding band, and means for causing the bands upon rotation of one of the rotary members, to exert an angular force serially from one band to the next adjacent band and ultimately to cause a frictional engagement between the outermost band and the outer rotary member.

12. In a clutch device, a rotary driving member, a rotary driven member, said members being coaxial, one of said members having an internal surface of revolution forming a clutching surface, a plurality of bands each having a gap, arranged between the members, said bands being of progressively increasing diameters from the inner rotary member to the outer rotary member, means for coupling one end of the innermost band to the inner rotary member, means for transmitting a force between one end of a band to the opposite end of the next succeeding band, and means for causing the bands upon rotation of one of the rotary members, to exert an angular force serially from one band to the next adjacent band and ultimately to cause a frictional engagement between the outermost band and the outer rotary member, comprising means initiating the expansion of one of the bands.

13. In a clutch device, a rotary driving member, a rotary driven member, said members being coaxial, one of said members having an internal surface of revolution forming a clutching surface, a plurality of bands each having a gap, arranged between the members, said bands being of progressively increasing diameters from the inner rotary member to the outer rotary member, means for coupling one end of the innermost band to the inner rotary member, means for transmitting a force between one end of a band to the opposite end of the next succeeding band, means for causing the bands upon rotation of one of the rotary members, to expand and to form contacting surfaces serially from one set of contacting surfaces to another and ultimately to cause a frictional engagement between the outermost band and the outer rotary member, said means being optionally movable to permit the bands to return to collapsed position, and means active only upon such optional movement for breaking the frictional engagement between the outermost band and the outer rotary member.

14. In a clutch device, a rotary driving member, a rotary driven member, said members being coaxial, one of said members having an internal surface of revolution forming a clutching surface, a plurality of bands each having a gap, arranged between the members, said bands being of progressively increasing diameters from the inner rotary member to the outer rotary member, means for coupling one end of the innermost band to the inner rotary member, means for transmitting a force between one end of a band to the opposite end of the next succeeding band, means for causing the bands upon rotation of one of the rotary members, to expand and to form contacting surfaces serially from one set of contacting surfaces to another and ultimately to cause a frictional engagement between the outermost band and the outer rotary member, and spring means constantly urging said bands to collapsed position.

15. In a clutch device, a rotary driving member, a rotary driven member, said members being coaxial, one of said members having an internal surface of revolution forming a clutching surface, a plurality of interrupted bands interposed between the members, said bands being nested and of progressively increasing diameters from the inner rotary member to the outer rotary member, means for coupling one end of the innermost band to the inner rotary member, means for transmitting a force serially and angularly through the bands to cause the peripheral surface of the outermost band to operate as a frictional clutching surface, and spring means constantly urging said bands to collapsed position.

16. In a clutch device, a rotary driving member, a rotary driven member, said members being coaxial, one of said members having an internal surface of revolution forming a clutching surface, a plurality of interrupted bands interposed between the members, said bands being nested and of progressively increasing diameters from the inner rotary member to the outer rotary member, said bands being resiliently expandable, means for coupling one end of the innermost band to the inner rotary member, and means for transmitting a force serially and angularly through the bands to cause the peripheral surface of the outermost band to operate as a frictional clutching surface.

17. In a device of the character described, a rotary driving member, a rotary driven member, said members being coaxial, the driven member having an internal surface of revolution forming a clutching surface, a plurality of interrupted bands interposed between the members, the ends of the bands forming gaps, the outermost band having a surface adapted frictionally to engage said internal surface, an abutment carried by the driving member and arranged to contact one of the ends of the innermost band, means for causing the innermost band to drive the succeeding band or bands by a force exerted on the ends of the succeeding band, and means for optionally causing initial frictional engagement between the outermost band and said internal surface.

18. In a device of the character described, a rotary driving member, a rotary driven member, said members being coaxial, the driven member having an internal surface of revolution forming a clutching surface, a plurality of interrupted bands interposed between the members, the ends of the bands forming gaps, said bands being capable of expanding, the outermost band in expanding having a surface cooperating frictionally with said internal surface, means for driving the innermost band by a force transmitted by the driving member, means operating on the outermost band optionally to expand it into frictional contact with said internal surface, and means operating through succeeding bands for creating a resultant expanding force on the outermost band, against the frictional restraint placed upon the outermost band by the internal surface.

WALTER J. MOORE.
STOVER C. WINGER.
LESLIE K. LOEHR.